US012601267B2

(12) United States Patent
Chin et al.

(10) Patent No.: US 12,601,267 B2
(45) Date of Patent: Apr. 14, 2026

(54) FORMING GAS TURBINE ENGINE AIRFOILS FROM CMCs WITH A KICKBACK TO FACILITATE MANDREL REMOVAL

(71) Applicant: RTX Corporation, Farmington, CT (US)

(72) Inventors: Jonathan L. Chin, Morrisville, NC (US); Andrew S. Miller, Marlborough, CT (US); Justin C. Pratt, Marlborough, CT (US); David J. Wasserman, Hamden, CT (US)

(73) Assignee: RTX Corporation, Farmington, CT (US)

( * ) Notice: Subject to any disclaimer, the term of this patent is extended or adjusted under 35 U.S.C. 154(b) by 59 days.

(21) Appl. No.: 18/442,887

(22) Filed: Feb. 15, 2024

(65) Prior Publication Data

US 2025/0264026 A1 Aug. 21, 2025

(51) Int. Cl.
*F01D 5/28* (2006.01)

(52) U.S. Cl.
CPC .......... *F01D 5/282* (2013.01); *F05D 2240/80* (2013.01); *F05D 2300/601* (2013.01); *F05D 2300/6033* (2013.01)

(58) Field of Classification Search
CPC ................. F01D 5/282; F05D 2240/80; F05D 2300/601; F05D 2300/6033
See application file for complete search history.

(56) References Cited

U.S. PATENT DOCUMENTS 4,008,023 A * 2/1977 Wentzell ............... B22F 3/1291 425/78
9,144,949 B2 9/2015 Ender
11,530,614 B2 12/2022 Burdette et al.
12,078,081 B1 * 9/2024 Banhos ................... F01D 5/284
2003/0207155 A1 * 11/2003 Morrison ................ B32B 18/00 428/699
2014/0193577 A1 * 7/2014 Monaghan ............ C04B 35/565 264/258
2018/0266264 A1 * 9/2018 Kerns ...................... F01D 9/042
2018/0363475 A1 12/2018 de Diego et al.
2020/0392049 A1 * 12/2020 Razzell ................... C04B 41/87
2021/0032995 A1 * 2/2021 Razzell ................. C04B 35/573
2021/0381384 A1 * 12/2021 Barker .................... F01D 5/147
2022/0268165 A1 8/2022 Burdette et al.
(Continued)

OTHER PUBLICATIONS

European Search Report for EP Application No. 25157796.1 dated Jul. 14, 2025.

*Primary Examiner* — Nahida Sultana
(74) *Attorney, Agent, or Firm* — Carlson, Gaskey & Olds, P.C.

(57) ABSTRACT

CMC yarn is formed on the outer surface of a mandrel, generally tracking the shape of the mandrel outer shape. CMC fabric layers are formed outwardly of the shear tube to form a desired shape of a final airfoil leading edge. The mandrel, and the shear tube are provided with a shape at at least one of the mandrel radially inner and outer ends to be spaced from the desired final shape of the airfoil leading edge at a corresponding one of a fabric radially inner and outer ends. A filler material is inserted into a space between the corresponding one of a fabric radially inner end and a fabric radially outer end of the fabric layers.

8 Claims, 4 Drawing Sheets

(56) References Cited

U.S. PATENT DOCUMENTS

| | | | | |
|---|---|---|---|---|
| 2023/0173623 | A1 | 6/2023 | Schneider et al. | |
| 2023/0174433 | A1* | 6/2023 | Jackson | C04B 41/5057<br>501/87 |
| 2023/0313692 | A1* | 10/2023 | Kim | F01D 5/282<br>415/200 |
| 2024/0102400 | A1* | 3/2024 | McCaffrey | C04B 35/565 |

* cited by examiner

FORMING GAS TURBINE ENGINE AIRFOILS FROM CMCs WITH A KICKBACK TO FACILITATE MANDREL REMOVAL

BACKGROUND

This application relates to a mandrel for forming an inner braided shear tube upon which outer fabric layers can be placed to form a final gas turbine engine airfoil.

Gas turbine engines are known, and typically include a propulsor delivering air as propulsion air. The air is also delivered into a compressor where it is mixed with fuel and ignited. Products of this combustion pass downstream over turbine rotors, driving them to rotate. It is known that the products of combustion are quite hot. Thus, ceramic matrix composites ("CMCs") are being considered to form components for the gas turbine engine.

In one method of forming a ceramic matrix composite airfoil, a mandrel serves as a base for formation of an inner shear tube formed of CMC yarn. Then, outer fabric layers of CMCs are placed on the shear tube. The airfoil is then densified to harden the CMCs. The mandrel must then be removable. As the shape of gas turbine engine airfoils gets more complex, removal of the mandrel is sometimes challenging.

SUMMARY

In a featured embodiment, a method of forming a gas turbine engine component includes the steps of providing a mandrel having a mandrel outer shape generally tracking a desired shape of a final airfoil leading edge. The mandrel has radially outer and inner mandrel ends and a mandrel leading edge and a mandrel trailing edge. A CMC yarn shear tube is formed on the outer surface of the mandrel, with the shear tube generally tracking the shape of the mandrel outer shape. CMC fabric layers are formed outwardly of the shear tube to form the desired shape of the final airfoil leading edge. The mandrel, and the shear tube are provided with a shape at at least one of the mandrel radially inner and outer ends to be spaced from the desired final shape of the airfoil leading edge at a corresponding one of a fabric radially inner and outer ends. A filler material is inserted into a space between the corresponding one of a fabric radially inner end and a fabric radially outer end of the fabric layers, and a corresponding one of a radially inner and a radially outer end of the shear tube. The CMC materials then begin to be densified. Then the mandrel is removed from the interior of the shear tube, with the spaced one of the mandrel radially inner end and mandrel radially outer end of the mandrel facilitating removal of the mandrel from within the shear tube.

In another embodiment according to the previous embodiment, the shear tube is formed by braiding.

In another embodiment according to any of the previous embodiments, a leading edge of the airfoil has a central bow, such that each of the fabric radially inner end and fabric radially outer end of the fabric layers extend more in a leading edge direction than does the central bow.

In another embodiment according to any of the previous embodiments, the one of the mandrel radially inner and mandrel outer ends of the mandrel is the radially inner end.

In another embodiment according to any of the previous embodiments, radially inner and outer platforms are also formed of CMC fabric layers, and are attached to the airfoil such that the final gas turbine engine component is a vane.

In another embodiment according to any of the previous embodiments, the one of the mandrel radially inner and outer ends of the mandrel does not extend more in a leading edge direction than does a central area of the mandrel corresponding to formation of the central bow of the final airfoil.

In another embodiment according to any of the previous embodiments, the one of the mandrel radially inner and outer ends of the mandrel does not extend more in a leading edge direction than does a central area of the mandrel corresponding to formation of the central bow of the final airfoil.

In another embodiment according to any of the previous embodiments, the one of the mandrel radially inner and outer ends of the mandrel does not extend more in a leading edge direction than does a central area of the mandrel corresponding to formation of the central bow of the final airfoil.

In another embodiment according to any of the previous embodiments, the one of the mandrel radially inner and mandrel outer ends of the mandrel is the mandrel radially inner end.

In another embodiment according to any of the previous embodiments, radially inner and outer platforms are also formed of CMC fabric layers, and are attached to the airfoil such that the final gas turbine engine component is a vane.

In another featured embodiment, a gas turbine engine vane includes a shear tube formed of ceramic matrix composite ("CMCs") yarn. The shear tube has shear tube radially inner and radially outer ends, and extends from a shear tube leading edge to a shear tube trailing edge. There is an outer airfoil structure formed of CMC fabric layers outwardly of the shear tube, and has corresponding fabric radially inner and radially outer ends with one of the shear tube radially inner and radially outer ends being in contact with a corresponding one of the fabric radially inner and outer ends of the CMC fabric layers. The other of the shear tube radially inner and outer ends are spaced from a corresponding one of the fabric radially inner and outer ends of the airfoil. A filler member is positioned in a space between the one of the shear tube radially inner and outer ends and the corresponding one of the fabric radially inner and outer ends.

In another embodiment according to any of the previous embodiments, the shear tube is formed from braided CMC yarn.

In another embodiment according to any of the previous embodiments, the leading edge of the final desired airfoil structure has a central bow, such that each of the fabric radially inner and radially outer ends extends more in a leading edge direction than does the central bow.

In another embodiment according to any of the previous embodiments, the one of the shear tube radially inner and radially outer ends is the shear tube radially inner end.

In another embodiment according to any of the previous embodiments, radially inner and outer platforms are also formed of CMC fabric layers, and are attached to the airfoil such that the final gas turbine engine component is a vane.

In another embodiment according to any of the previous embodiments, the one of the mandrel radially inner and outer ends of the mandrel does not extend more in a leading edge direction than does a central area of the mandrel corresponding to formation of the central bow of the final airfoil.

In another embodiment according to any of the previous embodiments, the one of the mandrel radially inner and outer ends of the mandrel does not extend more in a leading edge direction than does a central area of the mandrel corresponding to formation of the central bow of the final airfoil.

In another embodiment according to any of the previous embodiments, the one of the mandrel radially inner and outer ends of the mandrel does not extend more in a leading edge direction than does a central area of the mandrel corresponding to formation of the central bow of the final airfoil.

In another embodiment according to any of the previous embodiments, the leading edge of the final desired airfoil structure has a central bow, such that each of the fabric radially inner and radially outer ends extends more in a leading edge direction than does the central bow.

In another embodiment according to any of the previous embodiments, the one of the mandrel radially inner and outer ends of the mandrel does not extend more in a leading edge direction than does a central area of the mandrel corresponding to formation of the central bow of the final airfoil.

The present disclosure may include any one or more of the individual features disclosed above and/or below alone or in any combination thereof.

These and other features of the present invention can be best understood from the following specification and drawings, the following of which is a brief description.

DETAILED DESCRIPTION

Figure 1:
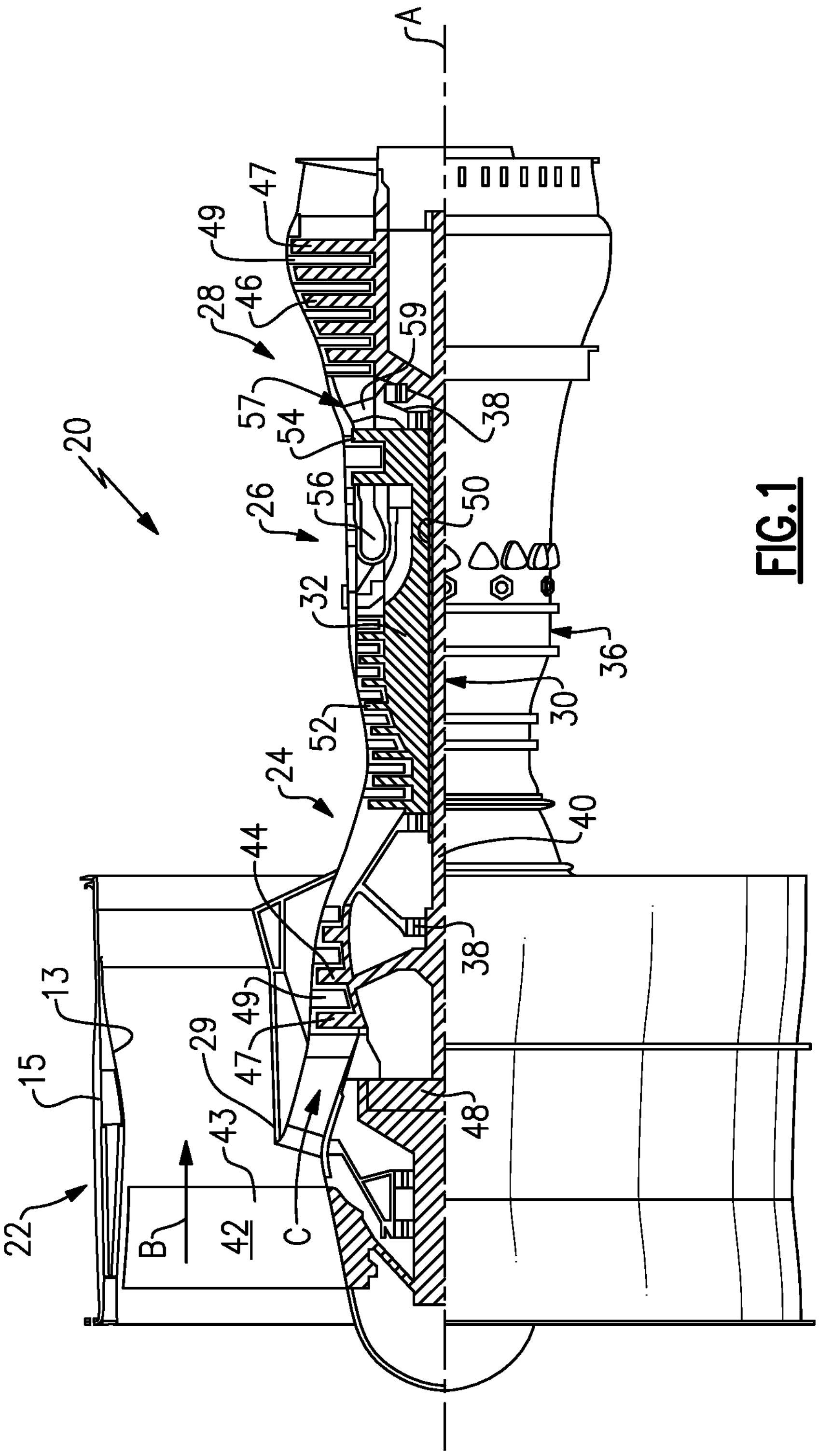
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 may include a single-stage fan 42 having a plurality of fan blades 43. The fan blades 43 may have a fixed stagger angle or may have a variable pitch to direct incoming airflow from an engine inlet. The fan 42 drives air along a bypass flow path B in a bypass duct 13 defined within a housing 15 such as a fan case or nacelle, and also drives air along a core flow path C for compression and communication into the combustor section 26 then expansion through the turbine section 28. A splitter 29 aft of the fan 42 divides the air between the bypass flow path B and the core flow path C. The housing 15 may surround the fan 42 to establish an outer diameter of the bypass duct 13. The splitter 29 may establish an inner diameter of the bypass duct 13. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures. The engine 20 may incorporate a variable area nozzle for varying an exit area of the bypass flow path B and/or a thrust reverser for generating reverse thrust.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in the exemplary gas turbine engine 20 is illustrated as a geared architecture 48 to drive the fan 42 at a lower speed than the low speed spool 30. The inner shaft 40 may interconnect the low pressure compressor 44 and low pressure turbine 46 such that the low pressure compressor 44 and low pressure turbine 46 are rotatable at a common speed and in a common direction. In other embodiments, the low pressure turbine 46 drives both the fan 42 and low pressure compressor 44 through the geared architecture 48 such that the fan 42 and low pressure compressor 44 are rotatable at a common speed. Although this application discloses geared architecture 48, its teaching may benefit direct drive engines having no geared architecture. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

Airflow in the core flow path C is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core flow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The fan 42 may have at least 10 fan blades 43 but no more than 20 or 24 fan blades 43. In examples, the fan 42 may have between 12 and 18 fan blades 43, such as 14 fan blades 43. An exemplary fan size measurement is a maximum radius between the tips of the fan blades 43 and the engine central longitudinal axis A. The maximum radius of the fan blades 43 can be at least 40 inches, or more narrowly no more than 75 inches. For example, the maximum radius of the fan blades 43 can be between 45 inches and 60 inches, such as between 50 inches and 55 inches. Another exemplary fan size measurement is a hub radius, which is defined as distance between a hub of the fan 42 at a location of the leading edges of the fan blades 43 and the engine central longitudinal axis A. The fan blades 43 may establish a fan hub-to-tip ratio, which is defined as a ratio of the hub radius divided by the maximum radius of the fan 42. The fan hub-to-tip ratio can be less than or equal to 0.35, or more narrowly greater than or equal to 0.20, such as between 0.25 and 0.30. The combination of fan blade counts and fan hub-to-tip ratios disclosed herein can provide the engine 20 with a relatively compact fan arrangement.

The low pressure compressor 44, high pressure compressor 52, high pressure turbine 54 and low pressure turbine 46 each include one or more stages having a row of rotatable airfoils. Each stage may include a row of vanes adjacent the rotatable airfoils. The rotatable airfoils are schematically indicated at 47, and the vanes are schematically indicated at 49.

The low pressure compressor 44 and low pressure turbine 46 can include an equal number of stages. For example, the engine 20 can include a three-stage low pressure compressor 44, an eight-stage high pressure compressor 52, a two-stage high pressure turbine 54, and a three-stage low pressure turbine 46 to provide a total of sixteen stages. In other examples, the low pressure compressor 44 includes a different (e.g., greater) number of stages than the low pressure turbine 46. For example, the engine 20 can include a five-stage low pressure compressor 44, a nine-stage high pressure compressor 52, a two-stage high pressure turbine 54, and a four-stage low pressure turbine 46 to provide a total of twenty stages. In other embodiments, the engine 20 includes a four-stage low pressure compressor 44, a nine-stage high pressure compressor 52, a two-stage high pressure turbine 54, and a three-stage low pressure turbine 46 to provide a total of eighteen stages. It should be understood that the engine 20 can incorporate other compressor and turbine stage counts, including any combination of stages disclosed herein.

The engine 20 may be a high-bypass geared aircraft engine. It should be understood that the teachings disclosed herein may be utilized with various engine architectures, such as low-bypass turbofan engines, prop fan and/or open rotor engines, turboprops, turbojets, etc. The bypass ratio can be greater than or equal to 10.0 and less than or equal to about 18.0, or more narrowly can be less than or equal to 16.0. The geared architecture 48 may be an epicyclic gear train, such as a planetary gear system or a star gear system. The epicyclic gear train may include a sun gear, a ring gear, a plurality of intermediate gears meshing with the sun gear and ring gear, and a carrier that supports the intermediate gears. The sun gear may provide an input to the gear train. The ring gear (e.g., star gear system) or carrier (e.g., planetary gear system) may provide an output of the gear train to drive the fan 42. A gear reduction ratio may be greater than or equal to 2.3, or more narrowly greater than or equal to 3.0, and in some embodiments the gear reduction ratio is greater than or equal to 3.4. The gear reduction ratio may be less than or equal to 4.0. The fan diameter is significantly larger than that of the low pressure compressor 44. The low pressure turbine 46 can have a pressure ratio that is greater than or equal to 8.0 and in some embodiments is greater than or equal to 10.0. The low pressure turbine pressure ratio can be less than or equal to 13.0, or more narrowly less than or equal to 12.0. Low pressure turbine 46 pressure ratio is pressure measured prior to an inlet of low pressure turbine 46 as related to the pressure at the outlet of the low pressure turbine 46 prior to an exhaust nozzle. It should be understood, however, that the above parameters are only exemplary of one embodiment of a geared architecture engine and that the present invention is applicable to other gas turbine engines including direct drive turbofans. All of these parameters are measured at the cruise condition described below.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. The engine parameters described above, and those in the next paragraph are measured at this condition unless otherwise specified.

"Fan pressure ratio" is the pressure ratio across the fan blade 43 alone, without a Fan Exit Guide Vane ("FEGV") system. A distance is established in a radial direction between the inner and outer diameters of the bypass duct 13 at an axial position corresponding to a leading edge of the splitter 29 relative to the engine central longitudinal axis A. The fan pressure ratio is a spanwise average of the pressure ratios measured across the fan blade 43 alone over radial positions corresponding to the distance. The fan pressure ratio can be less than or equal to 1.45, or more narrowly greater than or equal to 1.25, such as between 1.30 and 1.40. "Corrected fan tip speed" is the actual fan tip speed in ft/sec divided by an industry standard temperature correction of $[(\text{Tram } ° \text{R})/(518.7° \text{R})]^{0.5}$. The corrected fan tip speed can be less than or equal to 1150.0 ft/second (350.5 meters/second), and can be greater than or equal to 1000.0 ft/second (304.8 meters/second).

The fan 42, low pressure compressor 44 and high pressure compressor 52 can provide different amounts of compression of the incoming airflow that is delivered downstream to the turbine section 28 and cooperate to establish an overall pressure ratio (OPR). The OPR is a product of the fan pressure ratio across a root (i.e., 0% span) of the fan blade 43 alone, a pressure ratio across the low pressure compressor 44 and a pressure ratio across the high pressure compressor 52. The pressure ratio of the low pressure compressor 44 is measured as the pressure at the exit of the low pressure compressor 44 divided by the pressure at the inlet of the low pressure compressor 44. In examples, a sum of the pressure ratio of the low pressure compressor 44 and the fan pressure ratio is between 3.0 and 6.0, or more narrowly is between 4.0 and 5.5. The pressure ratio of the high pressure compressor ratio 52 is measured as the pressure at the exit of the high pressure compressor 52 divided by the pressure at the inlet of the high pressure compressor 52. In examples, the pressure ratio of the high pressure compressor 52 is between 9.0 and 12.0, or more narrowly is between 10.0 and 11.5. The OPR can be equal to or greater than 45.0, and can be less than or equal to 70.0, such as between 50.0 and 60.0. The overall and compressor pressure ratios disclosed herein are measured at the cruise condition described above, and can be utilized in two-spool architectures such as the engine 20 as well as three-spool engine architectures.

The engine 20 establishes a turbine entry temperature (TET). The TET is defined as a maximum temperature of combustion products communicated to an inlet of the turbine section 28 at a maximum takeoff (MTO) condition. The inlet is established at the leading edges of the axially forwardmost row of airfoils of the turbine section 28, and MTO is measured at maximum thrust of the engine 20 at static sea-level and 86 degrees Fahrenheit (° F.). The TET may be greater than or equal to 2700.0° F., or more narrowly less than or equal to 3500.0° F., such as between 2750.0° F. and 3350.0° F. The relatively high TET can be utilized in combination with the other techniques disclosed herein to provide a compact turbine arrangement.

The engine 20 establishes an exhaust gas temperature (EGT). The EGT is defined as a maximum temperature of combustion products in the core flow path C communicated to at the trailing edges of the axially aftmost row of airfoils of the turbine section 28 at the MTO condition. The EGT may be less than or equal to 1000.0° F., or more narrowly greater than or equal to 800.0° F., such as between 900.0° F. and 975.0° F. The relatively low EGT can be utilized in combination with the other techniques disclosed herein to reduce fuel consumption.

Figure 2:
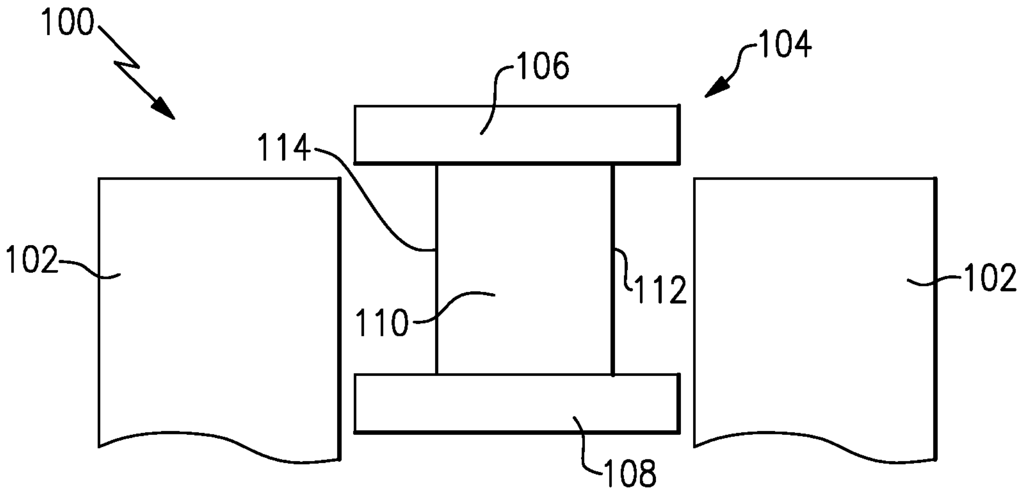
FIG. 2 schematically shows a portion of a turbine section.

FIG. 2 schematically shows a turbine section 100 having a pair of spaced rotating turbine blades 102. An intermediate static vane 104 is shown having an outer platform 106, an inner platform 108 and an intermediate airfoil 110. As known, the airfoil 110 extends between a leading edge 114 and a trailing edge 112.

Figure 3A:
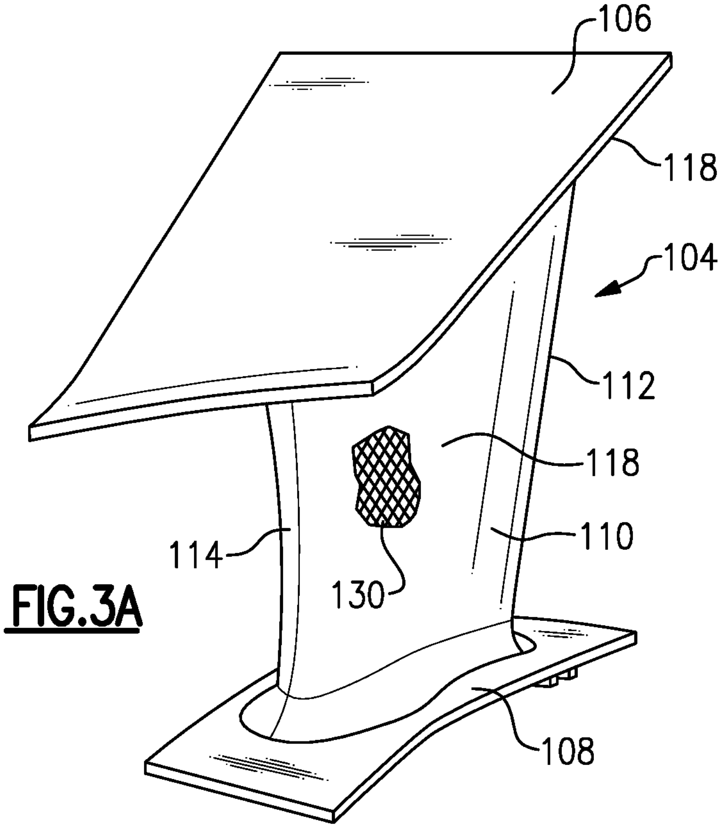
FIG. 3A shows a vane which may be incorporated into the FIG. 1 gas turbine engine.

FIG. 3A is a view of the vane 104. As known, there is a pressure side and a suction side. The airfoil 110 merges into both of the platforms 106 and 108 along each of the pressure and suction sides and around the leading edge 114 and the trailing edge 112.

The vane 104 is formed of layers of ceramic matrix composite fabric plies.

A CMC material is comprised of one or more ceramic fiber plies in a ceramic matrix. Example ceramic matrices are silicon-containing ceramic, such as but not limited to, a silicon carbide (SiC) matrix or a silicon nitride ($Si3N4$) matrix. Example ceramic reinforcement of the CMC are silicon-containing ceramic fibers, such as but not limited to, silicon carbide (SiC) fiber or silicon nitride ($Si3N4$) fibers. The CMC may be, but is not limited to, a SiC/SiC ceramic matrix composite in which SiC fiber plies are disposed within a SiC matrix. A fiber ply has a fiber architecture, which refers to an ordered arrangement of the fiber tows relative to one another, such as a 2D woven ply or a 3D structure. A monolithic ceramic does not contain fibers or reinforcement and is formed of a single material. Example monolithic ceramics include silicon-containing ceramics, such as silicon carbide (SiC) or silicon nitride ($Si3N4$).

In one known technique for forming the airfoil of a gas turbine engine component, such as vane 104, a mandrel provides a base for forming a so-called shear tube shown in part at 130. The shear tube 130 is formed of ceramic matrix composite ("CMCs") yarn. The yarn may be braided on an outer surface of the mandrel. In the prior art the mandrel and the CMC yarn structure formed on the mandrel have the same general shape as a desired final airfoil. CMC fabric layers are then placed outwardly of the shear tube 130 to form the final shape.

Figure 3B:
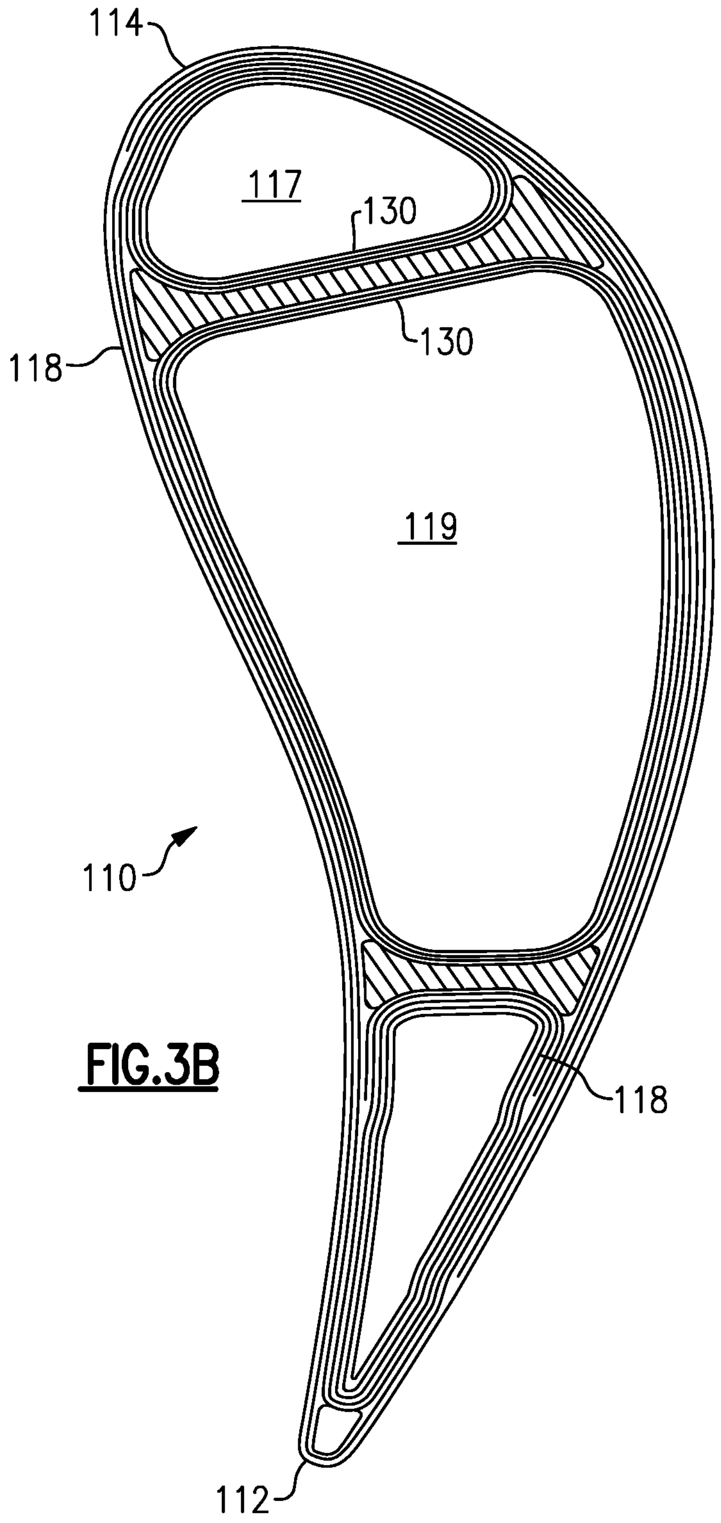
FIG. 3B is a cross-section through the FIG. 3A vane.

FIG. 3B shows the airfoil 110. The airfoil has a shear tube 130 received in a hollow chamber 117. Another shear tube 130 is in chamber 119 spaced further from the leading edge 114 than is the chamber 117. Outer fabric layers 118 are positioned outwardly of the shear tubes 130.

Once formed the structure is subject to chemical vapor deposition of materials to densify or solidify the CMCs. The mandrel is then removed. However, as the shape of airfoils in modern gas turbine engine components becomes more complex, the removal of the mandrel may become challenging.

Figure 4:
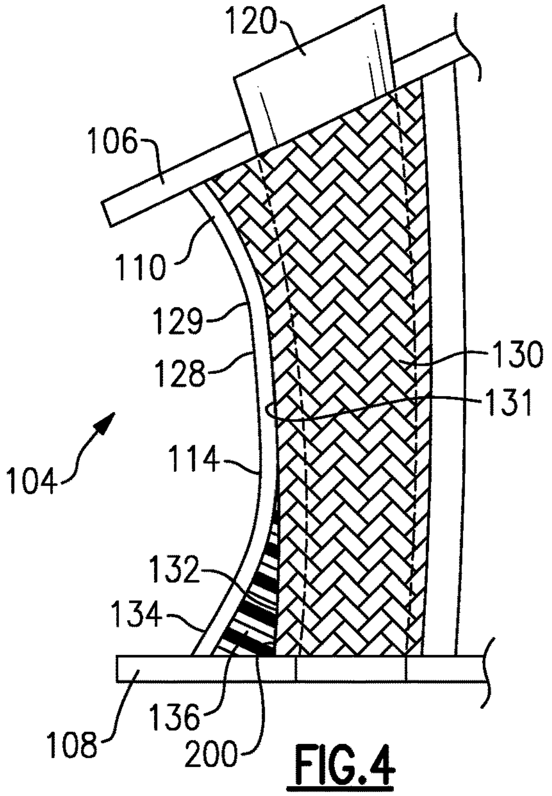
FIG. 4 shows a formation step for the vane such as shown in FIG. 3.

Thus, as shown in FIG. 4, a vane 104 has outer platform 106 and inner platform 108.

A leading edge 114 of the airfoil 110 is provided with a sharp central bow at 128. That is, areas 129 and 134 on each radial side of the central bow 128 extends further in the leading edge direction than does the bowed center 128.

Shear tube 130 provides a base for forming the airfoil 110 along with a mandrel 120 which forms in the shear tube 130. Shear tube 130 and mandrel 120 generally have the same shape as the airfoil 110 at the leading edge. Thus, the mandrel 120 and the shear tube 130 would typically have a radially outer end that follows area 129 and a radially inner end that follows shape 134. A forward edge 131 is bowed.

The mandrel 120 must be removed from the shear tube 130 after the CMC layers and yarns have been densified. If the mandrel 120 had a radially end which tracked the end 134, this would be challenging due to central bow 128.

Thus, as shown in FIG. 4, one radial end 200, here the radially inner end (although it could apply at the radially outer end) of both the mandrel 120 and the shear tube 130 are bent at 132 away from the shape of the radially inner end 134 of the airfoil 110.

In embodiments the radially inner end 200 of the mandrel does not extend more in a leading edge direction than does the bowed edge 131 of the mandrel 120 and shear tube 130.

In embodiments, a so-called noodle 136 which may be formed of loose CMC fibers densified with a matrix, is placed into the space between shapes 132 and 134 to provide a base for forming the radial end 134.

After the fabric layers 118, and the inner and outer platforms are all attached to the shear tube 130, the combined vane is placed into a chamber where it is densified by vapor deposition, or other appropriate methods. Once the vane has been densified the mandrel 120 is then removed.

In fact, in some embodiments the densification may be a multi-step process. As an example, there may be an initial run which applies an interface coating on the fiber to partially densify the matrix. The mandrel may then be removed, and further densification steps may be performed.

Figure 5:
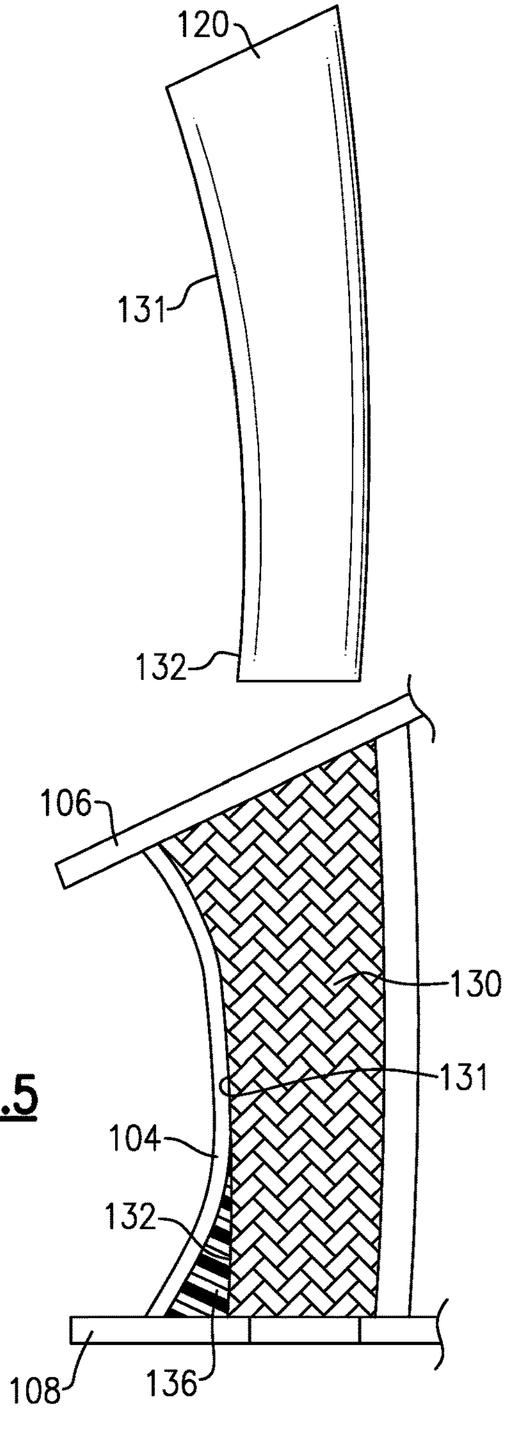
FIG. 5 shows a step subsequent to the FIG. 4 step.

As can be appreciated from FIG. 5, it is known relatively simple to remove the mandrel 120 from the now formed vane 104 after densification. The bend 132 away from leading edge 114 facilitates this removal.

In embodiments the mandrel may be formed from an appropriate graphite material.

A method of forming a gas turbine engine component under this disclosure could be said to include the steps of providing a mandrel having a mandrel outer shape generally tracking a desired shape of a final airfoil leading edge. The mandrel has radially outer and inner mandrel ends and a mandrel leading edge and a mandrel trailing edge. A CMC yarn shear tube is formed on the outer surface of the mandrel, with the shear tube generally tracking the shape of the mandrel outer shape. CMC fabric layers are formed outwardly of the shear tube to form the desired shape of the final airfoil leading edge. The mandrel, and the shear tube, are provided with a shape at at least one of the mandrel radially inner and outer ends to be spaced from the desired final shape of the airfoil leading edge at a corresponding one of a fabric radially inner and outer ends. A filler material is inserted into a space between the corresponding one of a fabric radially inner end and a fabric radially outer end of the fabric layers, and a corresponding one of a radially inner and a radially outer end of the shear tube. The CMC materials then begin to be densified. Then the mandrel is removed from the interior of the shear tube, with the spaced one of the mandrel radially inner end and mandrel radially outer end of the mandrel facilitating removal of the mandrel from within the shear tube.

A gas turbine engine vane under this disclosure could be said to include a shear tube formed of ceramic matrix composite ("CMCs") yarn. The shear tube having shear tube radially inner and radially outer ends, and extend from a shear tube leading edge to a shear tube trailing edge. There is an outer airfoil structure formed of CMC fabric layers outwardly of the shear tube, and has corresponding fabric radially inner and radially outer ends with one of said shear tube radially inner and radially outer ends being in contact with a corresponding one of the fabric radially inner and outer ends of the CMC fabric layers. The other of the shear tube radially inner and outer ends are spaced from a corresponding one of the fabric radially inner and outer ends of the airfoil. A filler member is positioned in a space between the one of the shear tube radially inner and outer ends and the corresponding one of the fabric radially inner and outer ends.

Although embodiments of this disclosure have been disclosed, a worker of ordinary skill in this art would recognize that modifications would come within the scope of this disclosure. For that reason, the following claims should be studied to determine the true scope and content of this disclosure.

What is claimed is:

1. A method of forming a gas turbine engine component comprising the steps of:

providing a mandrel having a mandrel outer shape generally tracking a desired shape of a final airfoil leading edge, the mandrel having radially outer and inner mandrel ends and a mandrel leading edge and a mandrel trailing edge;

forming a CMC yarn shear tube on the outer surface of the mandrel, with the shear tube generally tracking the shape of the mandrel outer shape;

forming CMC fabric layers outwardly of the shear tube to form the desired shape of the final airfoil leading edge;

providing the mandrel, and the shear tube, with a shape at at least one of the mandrel radially inner and outer ends to be spaced from the desired final shape of the airfoil leading edge at a corresponding one of a CMC fabric layers radially inner and outer ends, and inserting a filler material into a space between the corresponding one of the CMC fabric layers radially inner end and the CMC fabric layers radially outer end of the fabric layers, and a corresponding one of a radially inner and a radially outer end of the shear tube;

beginning densifying the CMC materials;

then removing the mandrel from the interior of the shear tube, with the spaced one of the mandrel radially inner end and mandrel radially outer end of the mandrel facilitating removal of the mandrel from within the shear tube;

wherein the shear tube is formed by braiding; and wherein a leading edge of the airfoil has a central bow, such that each of the fabric radially inner end and fabric radially outer end of the fabric layers extend more in a leading edge direction than does the central bow.

2. The method as set forth in claim 1, wherein the one of the mandrel radially inner and mandrel outer ends of the mandrel is the radially inner end.

3. The method as set forth in claim 2, wherein radially inner and outer platforms are also formed of CMC fabric layers, and are attached to the airfoil such that the final gas turbine engine component is a vane.

4. The method as set forth in claim 3, wherein the one of the mandrel radially inner and outer ends of the mandrel does not extend more in a leading edge direction than does a central area of the mandrel corresponding to formation of the central bow of the final airfoil.

5. The method as set forth in claim 2, wherein the one of the mandrel radially inner and outer ends of the mandrel does not extend more in a leading edge direction than does a central area of the mandrel corresponding to formation of the central bow of the final airfoil.

6. The method as set forth in claim 1, wherein the one of the mandrel radially inner and outer ends of the mandrel does not extend more in a leading edge direction than does a central area of the mandrel corresponding to formation of the central bow of the final airfoil.

7. The method as set forth in claim 1, wherein radially inner and outer platforms are also formed of CMC fabric layers, and are attached to the airfoil such that the final gas turbine engine component is a vane.

8. The method as set forth in claim 1, wherein the filler material is placed into the corresponding one of the CMC fabric layer radially inner end and the CMC fabric layers radially outer end, but not at the other of the CMC fabric layers radially inner end and radially outer end.

* * * * *